United States Patent
Dalrymple et al.

(10) Patent No.: US 7,891,425 B2
(45) Date of Patent: Feb. 22, 2011

(54) METHODS OF LIMITING OR PREVENTING FLUID FLOW THROUGH A PORTION OF A SUBTERRANEAN FORMATION

(75) Inventors: Eldon D. Dalrymple, Duncan, OK (US); Paul S. Brown, Duncan, OK (US); Larry S. Eoff, Duncan, OK (US); Julio E. Vasquez, Norman, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 86 days.

(21) Appl. No.: 12/156,075

(22) Filed: May 29, 2008

(65) Prior Publication Data

US 2009/0294126 A1 Dec. 3, 2009

(51) Int. Cl.
*E21B 33/138* (2006.01)
(52) U.S. Cl. ........................... 166/292; 166/300
(58) Field of Classification Search .............. None
See application file for complete search history.

(56) References Cited

U.S. PATENT DOCUMENTS

| | | | |
|---|---|---|---|
| 4,476,931 A | 10/1984 | Boles et al. | 166/294 |
| 4,633,950 A | 1/1987 | Delhommer et al. | 166/295 |
| 6,889,766 B2 | 5/2005 | Creel et al. | 166/270 |
| 6,889,780 B2 | 5/2005 | Whitfill et al. | 175/72 |
| 7,066,285 B2 | 6/2006 | Shaarpour | 175/72 |
| 2004/0020662 A1 | 2/2004 | Freyer | 166/387 |
| 2006/0213662 A1 | 9/2006 | Creel et al. | 166/286 |
| 2009/0038801 A1 * | 2/2009 | Ravi et al. | 166/293 |

FOREIGN PATENT DOCUMENTS

| | | |
|---|---|---|
| WO | WO 2006/053898 A2 | 5/2006 |
| WO | WO 2006/053898 A3 | 5/2006 |

* cited by examiner

*Primary Examiner*—Zakiya W. Bates
(74) *Attorney, Agent, or Firm*—Robert A. Kent; Booth Albanesi Schroeder LLC

(57) ABSTRACT

A method of limiting or preventing fluid flow through a portion of a subterranean formation comprises the steps of: (a) forming a treatment fluid comprising: (i) a water-swellable, water-insoluble elastomer in the form of discrete particles, wherein the particles of the water-swellable, water-insoluble elastomer have a characteristic of being capable of sticking together to form an agglomeration when exposed to water; and (ii) a carrier fluid for the water-swellable, water-insoluble elastomer; and (b) injecting the treatment fluid through a well into the subterranean formation to deposit the discrete particles of the water-swellable, water-insoluble elastomer in the subterranean formation.

23 Claims, No Drawings

METHODS OF LIMITING OR PREVENTING FLUID FLOW THROUGH A PORTION OF A SUBTERRANEAN FORMATION

CROSS-REFERENCE TO RELATED APPLICATIONS

Not applicable

STATEMENT REGARDING FEDERALLY SPONSORED RESEARCH OR DEVELOPMENT

Not Applicable.

REFERENCE TO A MICROFICHE APPENDIX

Not applicable.

TECHNICAL FIELD

The present invention relates to field of producing oil and/or gas from a subterranean reservoir. More specifically, the invention relates to the field of limiting or preventing fluid flow through a portion of a subterranean formation by placing a swelling agent therein.

SUMMARY OF THE INVENTION

According to the invention, a method of limiting or preventing fluid flow through a portion of a subterranean formation is provided. The method comprises the steps of: (a) forming a treatment fluid comprising: (i) a water-swellable, water-insoluble elastomer in the form of discrete particles, wherein the particles of the water-swellable, water-insoluble elastomer have a characteristic of being capable of sticking together to form an agglomeration when exposed to water; and (ii) a carrier fluid for the water-swellable, water-insoluble elastomer; and (b) injecting the treatment fluid through a well into the subterranean formation to deposit the discrete particles of the water-swellable, water-insoluble elastomer in the subterranean formation.

This and further aspects and advantages of the invention will become apparent to persons skilled in the art from the following detailed description of presently most-preferred embodiments of the invention.

DETAILED DESCRIPTION

According to the present invention, methods are performed to recover hydrocarbons, particularly oil, from a reservoir. Well bores can be drilled through the earth to penetrate the reservoir. Various completion techniques, which are known in the art, may be used to form one or more production wells and one or more injection wells. The injection wells and the production wells are strategically placed in communication with the reservoir such that a fluid injected into the injection wells can pass through the reservoir to the production wells, driving at least a portion of the oil in the reservoir to the production wells.

As used herein, the words "comprise," "has," and "include" and all grammatical variations thereof are each intended to have an open, non-limiting meaning that does not exclude additional elements or parts of an assembly, subassembly, or structural element.

As used herein, the term "elastomer" means any of various elastic materials that resemble rubber, that is, the material resumes its original shape when a deforming force is removed.

As used herein, the term "swellable" means that the material substantially increases in volume when exposed to water or an aqueous fluid. Preferably, the water-swellable elastomer swells to at least 150% of its dry volume when measured in distilled water at standard pressure (1 atmosphere) and room temperature, i.e., 22° C. (72° F.).

As used herein, the term "water insoluble" means that the material is substantially insoluble in water. Preferably, the water-insoluble elastomer is less then 1 weight % soluble when measured in distilled water at standard pressure (1 atmosphere) and room temperature, i.e., 22° C. (72° F.). Further, the water-swellable, water-insoluble elastomer is preferably insoluble in typical polar organic solvents, such as chloroform, acetone and acetonitrile.

Most preferably, the water-swellable, water-insoluble elastomer both swells to at least 150% of its dry volume when measured in distilled water at standard pressure (1 atmosphere) and room temperature, i.e., 22° C. (72° F.) and is less than 1 weight % soluble when measured in distilled water at standard pressure (1 atmosphere) and room temperature, i.e., 22° C. (72° F.).

In addition, the particles of the water-swellable, water-insoluble elastomer preferably have the characteristic of being capable of sticking together to form an agglomeration of particles when exposed to water. The elastomer can be, but need not be sticky to other materials. The particles of the agglomeration, especially if formed under pressure, should be capable of resisting separation, but need not be strongly bonded together. For example, the particles of the water-swellable, water-insoluble elastomer, when exposed to water and pressed together, such as when forced under fluid pressure into a fracture of a subterranean formation, will stick together in an agglomeration. In tight spaces, the particles will also tend to be forced together as they swell and retain water. The agglomeration of the water-swollen particles is expected to tend to resist separation and displacement when flowing back fluid from the well.

In general, the method of limiting or preventing fluid flow through a portion of a subterranean formation includes the steps of: (a) forming a treatment fluid comprising: (i) a water-swellable, water-insoluble elastomer in the form of discrete particles, wherein the particles of the water-swellable, water-insoluble elastomer have a characteristic of being capable of sticking together to form an agglomeration when exposed to water; and (ii) a carrier fluid for the water-swellable, water-insoluble elastomer; and (b) injecting the treatment fluid through a well into the subterranean formation to deposit the discrete particles of the water-swellable, water-insoluble elastomer in the subterranean formation.

Preferably, the method further includes the step of allowing the particles of the water-swellable, water-insoluble elastomer deposited into the subterranean formation time to swell in the presence of water or an aqueous fluid prior to putting the well on production, whereby the particles of the water-swellable, water-insoluble elastomer swell and tend to stick together in the subterranean formation.

The methods according to the invention can be used, for example, to block the fluid flow paths causing high water production or to block the fluid flow paths of an injection fluid used to drive the oil from the reservoir to a production well. While the methods of the invention can be used in either a production well or injection well, it is expected that a method according to the invention will have a more advantageous application in a production well. In a production well, an injected fluid is expected to flow back into the well from the formation after the application of the treatment fluid. Accordingly, the step of injecting the treatment fluid through a well preferably further includes injecting the treatment fluid through a production well, whereby when the particles swell and stick together in the subterranean formation, the particles have an improved ability to resist flow back. For example, the methods of the invention can be bullheaded into a well to plug one or more unwanted fractures.

While the methods of the invention can be used to help remedy various particular problems encountered in the production of oil and gas from or through a subterranean formation, it is expected that a method according to the invention will have a more advantageous application where the portion of the subterranean formation has fingers or streaks of relatively high permeability, which in some situations can contribute to problems of undesirably high water production from the well. Accordingly, the step of injecting the treatment fluid through a well preferably further includes the step of: selecting a subterranean formation having relatively high permeability. Examples of such permeable zones that the swelling elastomer may enter include fractures, vugs, voids, fissures.

According to a presently-preferred embodiment of the present invention, the water-swellable, water-insoluble elastomer comprises a polymer, wherein the polymer includes monomer units having a sulfonic-acid functionality or salt thereof. Preferably, the monomer units have a sulfonic-acid functionality or salt thereof that is selected from the group consisting of: 2-methylprop-2-ene-1-sulfonic acid or alkali-metal 2-methylprop-2-ene-1-sulfonate. Accordingly, for example, the water-swellable, water-insoluble elastomer can comprise a polymer or co-polymer of sodium 2-methylprop-2-ene-1-sulfonate, also known as sodium methyl allyl sulfonate ("SMAS"), and further identified as CAS 1561-92-8.

According to a presently-preferred embodiment, the discrete particles of the water-swellable, water-insoluble elastomer have a screened size of less than or equal to mesh 3. Also, the discrete particles of the water-swellable, water-insoluble elastomer preferably have a screened size of greater than or equal to mesh 30. Most preferably, the discreet particles of the water-swellable, water-insoluble elastomer have a screen size within the range of mesh 3 to mesh 30. For example, the dry bulk elastomer can be ground into crumbs and screened to obtain the desirable particle size range.

According to some embodiments, the water-swellable, water-insoluble elastomer is combined with a carrier fluid to form a treatment fluid before being injected through a well. The carrier fluid can be any suitable fluid for moving or carrying the water-swellable, water-insoluble elastomer to desired locations in the subterranean formation. The combination of the water-swellable, water-insoluble elastomer and the carrier fluid should be a pumpable fluid.

The carrier fluid is preferably selected such that it is compatible with and will not damage the subterranean formation. For example, the carrier fluid is preferably not highly acidic, which could damage certain types of subterranean formations, as will be appreciated by those of skill in the art.

Examples of carrier fluids with which the water-swellable, water-insoluble elastomer may be combined include but are not limited to fresh water, deionized water, brine water of varying salinity, chloride solutions such as calcium dichloride and potassium chloride solutions, hydrocarbons such as produced oil and diesel oil, and synthetic fluids such as ester or polymer based fluids. According to a preferred embodiment of the invention, the carrier fluid comprises water. It is further contemplated that the water of the carrier fluid can include dissolved salts.

Preferably, the carrier fluid is capable of at least temporarily suspending the water-swellable, water-insoluble elastomer. As the discrete particles of the water-swellable, water-insoluble elastomer may have a specific gravity different than water, the carrier fluid can further comprises a viscosity-increasing agent to help suspend the water-swellable, water-insoluble elastomer in the carrier fluid. If a viscosity-increasing agent is included, it can further be helpful for the carrier fluid to additionally include a breaker for the viscosity-increasing agent that is adapted to break the viscosity of the fluid after a period of time at the static temperature of the subterranean formation, whereby the carrier fluid can be used to place the particles of the water-swellable, water-insoluble elastomer into the subterranean formation and then after allowing sufficient time for the viscosity of the carrier fluid to be broken by the breaker, the carrier fluid can be removed from the subterranean formation leaving the particles of the water-swellable, water-insoluble elastomer deposited in the subterranean formation.

Preferably, the treatment fluid comprising the carrier fluid for the water-swellable, water-insoluble elastomer remains sufficiently non-viscous in order to be displaced into the permeable areas of the reservoir with minimal pressure. Thus, there is preferably no need to apply higher pressure that could damage the rock structure surrounding the portion of the subterranean formation in an attempt to force the water-swellable, water-insoluble elastomer into the permeable zones.

According to a further embodiment of the invention, the carrier fluid can include a gas for foaming the treatment fluid. This can help with the placement of the treatment fluid and the discrete particles of the water-swellable, water-insoluble elastomer in the subterranean formation. Examples of such a gas are nitrogen and carbon dioxide.

In cases where it is desirable to delay the swelling of the water-swellable, water-insoluble elastomer, the carrier fluid is preferably substantially free of water. The method can further include the step of injecting water for swelling the water-swellable elastomer into the formation after the treatment fluid. While water may be present in the formation or move through the formation, it is presently believed it will be more advantageous to place the discrete particles of the elastomer with water or to inject water after placement but before any flow back of fluid from the formation. This will better allow for the particles to swell and stick together before flowback, which will help the particles be resistant to flowback.

It is further contemplated that particles of the water-swellable, water-insoluble elastomer can be coated with a water-insoluble material, such as a wax or paraffin, whereby when exposed to a downhole temperature greater than typical surface temperatures, e.g., greater than 40° C. (104° F.), the coating melts so that the particle material is exposed to surrounding water and can begin to swell. According to a preferred embodiment of the invention, the particles of the water-swellable, water-insoluble elastomer are coated with a water-insoluble material that melts at a temperature of greater than 40° C. (104° F.) and less than 110° C. (230° F.). Further, the coating material preferably has a melting point that is lower than the upper end of the useful range of the particular water-swellable, water-soluble elastomer used in the method. In a presently-preferred embodiment, for example, the particles of the water-swellable, water-insoluble elastomer can be coated with a coating material comprising wax, such as paraffin wax, whereby when exposed to a downhole temperature greater than the melting point of the coating material, the coating melts so that the particles of the water-swellable, water-insoluble elastomer are exposed to surrounding water and can begin to swell.

The water-swellable, water-insoluble elastomer is preferably incorporated in the carrier fluid in an effective amount for plugging a permeable zone upon being placed down hole and into the formation. The effective amount can vary depending on factors such as the type of the carrier fluid, the size of a fracture, fissure, etc., and the like. The amount of water-swellable, water-insoluble elastomer that may be combined with the carrier fluid depends on a number of factors including the type of carrier fluid. In general, the carrier fluid may contain from about 0.001 to about 5.0 pounds water-swellable, water-insoluble elastomer/gallon carrier fluid, more preferably from about 0.01 to about 2.0 ppg.

According to a presently-preferred embodiment of the invention, a method of limiting or preventing fluid flow through a portion of a subterranean formation is provided including the steps of: (a) forming a treatment fluid comprising: (i) a water-swellable, water-insoluble elastomer in the form of discrete particles, wherein the particles of the water-swellable, water-insoluble elastomer have a characteristic of being capable of sticking together to form an agglomeration when exposed to water, wherein the water-swellable, water-insoluble elastomer swells to at least 150% of its dry volume when measured in distilled water at standard pressure (1 atmosphere) and room temperature, i.e., 22° C. (72° F.) and is less than 1 weight % soluble when measured in distilled water at standard pressure (1 atmosphere) and room temperature, i.e., 22° C. (72° F.), wherein the water-swellable, water-insoluble elastomer comprises a polymer, and wherein the polymer comprises monomer units having a sulfonic-acid functionality or salt thereof; and (ii) a carrier fluid for the water-swellable, water-insoluble elastomer; and (b) injecting the treatment fluid through a well into the subterranean formation to deposit the discrete particles of the water-swellable, water-insoluble elastomer in the subterranean formation.

In each of the embodiments above, the amount of oil and/or water production may be monitored to determine if more water-swellable, water-insoluble elastomer should be added to the reservoir to block additional permeable areas and thus further improve oil or gas production. If needed, one of the embodiments described above may be performed to introduce additional water-swellable, water-insoluble elastomer. The methods can be repeated until the amount of water-swellable, water-insoluble elastomer is sufficient to achieve a desired decrease in the water-oil ratio of production.

If desired, the water-swellable, water-insoluble elastomer can be removed from the potion of the subterranean formation after it has been used for its intended purpose. It is expected that the backbone structure of the elastomer can be broken down such that it becomes more like a liquid. Any known means may be used to break down or collapse the elastomer. For example, it can be contacted with an oxidizer such as sodium hypochlorite (i.e., bleach) to eliminate the polymer from the reservoir, preferably by pumping such compounds down the well bore and contacting the swollen elastomer in situ.

According to the best mode contemplated for practicing the invention, a suitable carrier fluid compatible with the formation is used to pump particles of a water-swellable, water-insoluble elastomer into an interval of a wellbore and into the surrounding subterranean formation that has undesirable voids. These voids may cause problems of poor injection profile or high water production. Preferably, the elastomer is a polymer comprising monomer units having a sulfonic-acid functionality or salt thereof. The particles increase dramatically in size over time and temperature via absorption of water. The water may be already contained in the reservoir or that which is pumped into the formation, either ahead, behind, and/or as the carrier fluid. This type of elastomer can swell in excess of 200% of its original size. The rubber sample can be ground, for example, to a particle size of approximately 4 mm across. The particles have a characteristic in that in addition to being water-swellable, they can connect or stick together to form a continuous, interconnected "film". This continuous interconnected "film" makes the seal complete, without a need of anything additional to prevent their backflow into the wellbore.

Core testing has been performed using particulates which can be pumped into a formation, then increase in volume via absorption of the surrounding aqueous fluid (e.g., water/brine). The water-swellable, water-insoluble rubber was ground to a particle size of about 4 mm. When placed into voids within core samples, representing fractures, vugs, voids, and fissures that form "least-resistant flow paths" (or permeable zones) the sample exhibited the anticipated swelling, which would be used to seal these undesired areas. The water-swellable rubber exhibited the unexpected feature of its individual particles forming a continuous, connected "film." A couple of other samples of water-swellable elastomer, although swollen with the absorption of water, were still distinct particles.

This unexpected feature of the individual particles forming a "film" brings the added advantage of the elastomer being much more resistant to flowing back out of the well as compared to the other systems, thus making it more applicable to producing wells and not requiring another material against it to prevent its being produced back out of the formation into the wellbore.

The water-swellable, water-insoluble elastomer preferably has a useful range including at least 0-110° C. (32-230° F.).

There are several methods for polymerization of such monomers that would be expected to yield an elastomer having the desired characteristics. Bulk polymerization is expected to be the least preferred method. Preferable methods are expected to include emulsion polymerization processes.

In an emulsion polymerization process, to a reactor vessel containing water and oil, add a surfactant for emulsion formation, add the monomer, add a radical source, such as persulfate or other radical generator (where order of addition may vary for above three), purge with nitrogen, heat to initiation of reaction, stop when desired product obtained, and separate by addition of salt solution or other material that will cause precipitation It should be understood, of course, that two or more of the various preferred elements or steps of the invention can be advantageously practiced together to increase the efficiency and benefits that can be obtained from the invention.

Thus, the present invention is well adapted to carry out the objects and attain the ends and advantages mentioned above as well as those inherent therein. While preferred embodiments of the invention have been described for the purpose of this disclosure, changes in the construction and arrangement of parts and the performance of steps can be made by those skilled in the art, which changes are encompassed within the spirit of this invention as defined by the appended claims.

What is claimed is:

1. A method of limiting or preventing fluid flow through a portion of a subterranean formation, the method comprising the steps of:
    (a) forming a treatment fluid comprising:
        (i) a water-swellable, water-insoluble elastomer in the form of discrete particles, wherein the particles of the water-swellable, water-insoluble elastomer have a characteristic of being capable of sticking together to form an agglomeration when exposed to water; and (ii) a carrier fluid for the water-swellable, water-insoluble elastomer; and (b) injecting the treatment fluid through a well into the subterranean formation to deposit the discrete particles of the water-swellable, water-insoluble elastomer in the subterranean formation.

2. The method according to claim 1, further comprising the step of allowing the water-swellable, water-insoluble elastomer deposited into the subterranean formation time to swell in the presence of water or an aqueous fluid prior to flowing back of fluid from the subterranean formation, whereby the particles of the water-swellable, water-insoluble elastomer swell and tend to stick together in the subterranean formation.

3. The method according to claim 1, wherein the step of injecting the treatment fluid through a well further comprises injecting the treatment fluid through a production well, whereby when the particles swell and stick together in the subterranean formation, the particles have an improved ability to resist flow back.

4. The method according to claim 3, further comprising the step of: selecting a subterranean formation having fingers or streaks of relatively high permeability, which caused high water production.

5. The method according to claim 1, wherein the water-swellable, water-insoluble elastomer swells to at least 150% of its dry volume when measured in distilled water at 1 atmosphere and 22° C. (72° F.).

6. The method according to claim 1, wherein the water-swellable, water-insoluble elastomer is less then 1 weight % soluble when measured in distilled water at 1 atmosphere and 22° C. (72° F.).

7. The method according to claim 1, wherein the water-swellable, water-insoluble elastomer swells to at least 150% of its dry volume when measured in distilled water at 1 atmosphere and 22° C. (72° F.) and is less than 1 weight % soluble when measured in distilled water at 1 atmosphere and 22° C. (72° F.).

8. The method according to claim 1, wherein the water-swellable, water-insoluble elastomer comprises a polymer, and wherein the polymer comprises monomer units having a sulfonic-acid functionality or salt thereof.

9. The method according to claim 8, wherein the monomer units having a sulfonic-acid functionality or salt thereof is selected from the group consisting of: 2-methylprop-2-ene-1-sulfonic acid or alkali-metal 2-methylprop-2-ene-1-sulfonate.

10. The method according to claim 1, wherein the water-swellable, water-insoluble elastomer comprises a polymer or co-polymer of sodium 2-methylprop-2-ene-1-sulfonate.

11. The method according to claim 1, wherein the discrete particles of the water-swellable, water-insoluble elastomer have a screened size of less than or equal to mesh 3.

12. The method according to claim 1, wherein the discrete particles of the water-swellable, water-insoluble elastomer have a screened size of greater than or equal to mesh 30.

13. The method according to claim 1, wherein the discreet particles of the water-swellable, water-insoluble elastomer have a screen size within the range of mesh 3 to mesh 30.

14. The method according to claim 1, wherein the carrier fluid is compatible with and will not damage the subterranean formation.

15. The method according to claim 1, wherein the carrier fluid comprises water.

16. The method according to claim 15, wherein the water of the carrier fluid comprises brine.

17. The method according to claim 15, wherein the carrier fluid further comprises a viscosity-increasing agent to help suspend the water-swellable, water-insoluble elastomer in the carrier fluid.

18. The method according to claim 17, wherein the carrier fluid further comprises a breaker for the viscosity-increasing agent adapted to break the viscosity of the fluid after a period of time at the static temperature of the subterranean formation.

19. The method according to claim 1, wherein the carrier fluid comprises a gas for foaming the treatment fluid.

20. The method according to claim 1, wherein water for swelling the swellable the water-swellable elastomer is pumped into the formation after the treatment fluid.

21. The method according to claim 1, wherein the particles of the water-swellable, water-insoluble elastomer are coated with a water-insoluble material that melts at a temperature of greater than 40° C. (104° F.) and less than 120° C. (248° F.).

22. The method according to claim 1, wherein the particles of the water-swellable, water-insoluble elastomer are coated with a coating material a wax, whereby when exposed to a downhole temperature greater than the melting point of the coating material, the coating melts so that the particles of the water-swellable, water-insoluble elastomer are exposed to surrounding water and can begin to swell.

23. A method of limiting or preventing fluid flow through a portion of a subterranean formation, the method comprising the steps of:

(a) forming a treatment fluid comprising:
(i) a water-swellable, water-insoluble elastomer in the form of discrete particles, wherein the particles of the water-swellable, water-insoluble elastomer have a characteristic of being capable of sticking together to form an agglomeration when exposed to water, wherein the water-swellable, water-insoluble elastomer swells to at least 150% of its dry volume when measured in distilled water at 1 atmosphere and 22° C. (72° F.) and is less than 1 weight % soluble when measured in distilled water at 1 atmosphere and 22° C. (72° F.), wherein the water-swellable, water-insoluble elastomer comprises a polymer, and wherein the polymer comprises monomer units having a sulfonic-acid functionality or salt thereof; and
(ii) a carrier fluid for the water-swellable, water-insoluble elastomer; and (b) injecting the treatment fluid through a well into the subterranean formation to deposit the discrete particles of the water-swellable, water-insoluble elastomer in the subterranean formation.

* * * * *